United States Patent [19]

Kouyama et al.

[11] Patent Number: 4,897,238

[45] Date of Patent: Jan. 30, 1990

[54] STRETCHED POLY(ARYLENE THIOETHER-KETONE) FILMS AND PRODUCTION PROCESS THEREOF

[75] Inventors: Toshitaka Kouyama; Takayuki Katto; Zenya Shiiki; Yoshikatsu Satake, all of Iwaki; Toshiya Mizuno, Tsuchiura; Yo Iizuka, Iwaki, all of Japan

[73] Assignee: Kureha Kagaku Kogyo K.K., Tokyo, Japan

[21] Appl. No.: 354,323

[22] Filed: May 19, 1989

Related U.S. Application Data

[62] Division of Ser. No. 194,015, May 12, 1988.

[30] Foreign Application Priority Data

May 15, 1987 [JP] Japan ............................... 62-118620
Jul. 21, 1987 [JP] Japan ............................... 62-181970

[51] Int. Cl.⁴ .................... C08F 283/00; B29C 55/00; B29D 7/22
[52] U.S. Cl. ............................ 264/288.4; 264/290.2; 524/592; 525/471
[58] Field of Search .................... 264/288.4, 290.2; 524/592; 525/471

[56] References Cited

U.S. PATENT DOCUMENTS 4,590,104 5/1986 Ziener .
4,690,972 9/1987 Johnson et al. .................... 525/471
4,698,415 10/1987 Sinclair et al. .................... 528/226
4,716,212 12/1987 Gaughan ............................ 528/226
4,745,167 5/1988 Iizuka et al. .

FOREIGN PATENT DOCUMENTS 270955 6/1988 European Pat. Off. .
274754 7/1988 European Pat. Off. .
280325 8/1988 European Pat. Off. .
3405523 8/1985 Fed. Rep. of Germany .
47-13347 7/1972 Japan .
58435 4/1985 Japan .
60-104126 6/1985 Japan .
61-221229 10/1986 Japan .

OTHER PUBLICATIONS

Indian J. Chem., vol. 21A, May 1982, pp. 501-502.
Indian Journal of Pure and Applied Physics, vol. 22, Apr. 1984, pp. 247-248.
Mol. Cryst. Liq. Cryst., vol. 83, 1982, pp. 229-238.

Primary Examiner—Morton Foelak
Attorney, Agent, or Firm—Lowe, Price, Leblanc, Becker & Shur

[57] ABSTRACT

Disclosed herein is a stretched poly(arylene thioether-ketone) film made of a thermoplastic material which comprises (A) 100 parts by weight of a melt-stable poly-(arylene thioether-ketone) having predominant recurring units of the formula

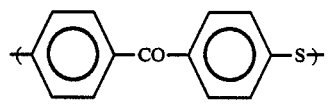

and having a melting point, Tm of 310°-380° C., a residual melt crystallization enthalpy, $\Delta Hmc$ (420° C./10 min) of at least 10 J/g and a melt crystallization temperature, Tmc (420° C./10 min) of at least 210° C., and a reduced viscosity of 0.3-2 dl/g as determined by viscosity measurement at 25° C. and a polymer concentration of 0.5 g/dl in 98 percent by weight sulfuric acid; and optionally, (B) up to 100 parts by weight of at least one of thermoplastic resins and/or up to 15 parts by weight of at least one of fillers. Its production process is also disclosed.

4 Claims, No Drawings

STRETCHED POLY(ARYLENE THIOETHER-KETONE) FILMS AND PRODUCTION PROCESS THEREOF

This is a division, of application Ser. No. 07/194,015 filed May 12, 1988.

FIELD OF THE INVENTION

This invention relates to stretched films of a melt-stable poly(arylene thioether-ketone) (hereinafter abbreviated as "PTK") having predominant recurring units of the formula

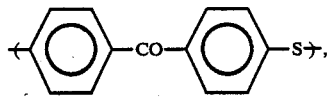

in which the —CO— and —S— are in the para position to each other, and more specifically to stretched films made of a thermoplastic material, which is composed of the melt-stable PTK alone or the melt-stable PTK and at least one of other thermoplastic resins and/or at least one of fillers, and having high heat resistance, strength and lubricity.

BACKGROUND OF THE INVENTION

With the advance of weight-, thickness- and length-reducing technology in the field of the electronic and electric industry and with the recent advancement of weight-reducing technology in the fields of the automobile, aircraft and space industries, there has been a strong demand for crystalline thermoplastic resins having heat resistance of about 300° C. or higher and permitting easy melt processing in recent years.

As crystalline, heat-resistant, thermoplastic resins developed to date, there are, for example, poly(butylene terephthalate), polyacetal, poly(p-phenylene thioether) (PPS), etc. These resins are however unable to meet the recent requirement level for heat resistance.

Polyether ether ketones (PEEKs) and polyether ketones (PEKs) have recently been developed as heat-resistant resins having a melting point of about 300° C. or higher. These resins are crystalline thermoplastic resins. It has therefore been known that conventional melt processing techniques such as extrusion, injection molding and melt spinning can be applied to easily form them into various molded or formed articles such as extruded products, injection-molded products, fibers and films. These resins however use expensive fluorine-substituted aromatic compounds such as 4,4'-difluorobenzophenone as their raw materials. Limitations are thus said to exist to the reduction of their costs. It is also pointed out that these resins involve a problem in expanding their consumption.

Based on an assumption that PTKs could be promising candidates for heat-resistant thermoplastic resins like PEEKs and PEKs owing to their similarity in chemical structure, PTKs have been studied to some extent to date. There are some disclosure on PTKs, for example, in Japanese Patent Laid-Open No. 58435/1985 (hereinafter abbreviated as "Publication A"), German Offenlegungsschrift 34 05 523A1 (hereinafter abbreviated as "Publication B"), Japanese Patent Laid-Open No. 104126/1985 (hereinafter abbreviated as "Publication C"), Japanese Patent Laid-Open No. 13347/1972 (hereinafter abbreviated as "Publication D"), Indian J. Chem., 21A, 501–502 (May, 1982) (hereinafter abbreviated as "Publication E"), and Japanese Patent Laid-Open No. 221229/1986 (hereinafter abbreviated as "Publication F").

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

It was attempted to produce some molded or formed products in Publications A and B. Since the PTKs had poor melt stability, certain specified types of molded or formed products were only obtained by a special molding or forming process, where PTKs were used only as a sort of binder, being impregnated into a great deal of reinforcing fibers of main structural materials and molded or formed under pressure.

Since the conventional PTKs are all insufficient in melt stability as described above, it has been unable to obtain formed products such as films by applying conventional melt processing techniques.

OBJECTS AND SUMMARY OF THE INVENTION

An object of this invention is to overcome the above-mentioned drawbacks of the prior art PTKs and hence to provide stretched films by using a novel melt-stable PTK which permits easy application of conventional melt processing techniques.

Another object of this invention is to provide stretched films having heat resistance, strength and lubricity from a thermoplastic material which is composed of the melt-stable PTK alone or the melt-stable PTK and at least one of other thermoplastic resins and-/or at least one of fillers.

The present inventors started an investigation with a view toward using economical dichlorobenzophenone and/or dibromobenzophenone as a raw material for PTK without employing any expensive fluorine-substituted aromatic compound. In addition, a polymerization process was designed in an attempt to conduct polymerization by increasing the water content in the polymerization system to an extremely high level compared to processes reported previously, adding a polymerization aid and suitably controlling the profile of the polymerization temperature. As a result, it has been found that the above process can afford high molecular-weight PTKs economically. The PTKs obtained by the above new process were however still dissatisfactory in melt stability. Thus, the present inventors made further improvements in the polymerization process. It was then revealed that melt-stable PTKs, which permitted the application of conventional melt processing techniques, could be obtained by conducting polymerization without addition of any polymerization aid while paying attention to the selection of a charge ratio of monomers, the shortening of the polymerization time at high temperatures, the selection of a material for a polymerization reactor, etc. and if necessary, by conducting a stabilization treatment in a final stage of the polymerization. It was also found that formed products such as films could be obtained easily from such melt-stable PTKs by general melt-processing methods.

Based on these findings, the present inventors has proceeded with a further investigation on the production of stretched films. The investigation has eventually resulted in the completion of the present invention.

In one aspect of this invention, there is thus provided a stretched poly(arylene thioether-ketone) film made of a thermoplastic material which comprises:

(A) 100 parts by weight of a melt-stable poly(arylene thioether-ketone) having predominant recurring units of the formula

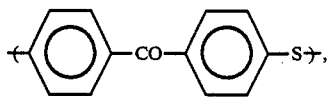

wherein the —CO— and —S— are in the para position to each other, and having the following physical properties (a)-(c):

(a) melting point, Tm being 310°-380° C.;

(b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter (hereinafter abbreviated as "DSC") at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and (c) reduced viscosity being 0.3-2 dl/g as determined by viscosity measurement at 25° C. and a polymer concentration of 0.5 g/dl in 98 percent by weight sulfuric acid; and optionally, (B) up to 100 parts by weight of at least one of thermoplastic resins and/or up to 15 parts by weight of at least one of fillers.

In another aspect of this invention there is also provided a process for the production of a stretched poly(arylene thioether-ketone) film, which comprises, upon processing the thermoplastic material into the stretched poly(arylene thioether-ketone) film, forming the thermoplastic material into an amorphous film, stretching, as first-stage stretching, the amorphous film to a draw ratio of from 1.5:1 to 7:1 in one direction at 100°-180° C. to give a birefringence of 0.05-0.35, stretching, as optional second-stage stretching, the resultant film to a draw ratio of from 1.5:1 to 7:1 in a direction perpendicular to said one direction at 100°-180° C., and then heat setting the resulting film at a temperature of from 200° C. to a temperature just below the melting point of the poly(arylene thioether-ketone).

In a further aspect of this invention, there is also provided a process for the production of a stretched poly(arylene thioether-ketone) film, which comprises, upon processing the thermoplastic material into the stretched poly(arylene thioether-ketone) film, forming the thermoplastic material into an amorphous film, stretching the amorphous film to a draw ratio of from 1.5:1 to 7:1 simultaneously in both machine and transverse directions at 100°-180° C. and then heat setting the resultant film at a temperature of from 200° C. to a temperature below the melting point of the poly(arylene thioether-ketone).

The present invention can therefore provide stretched films, which have high heat resistance, strength and lubricity, by using a PTK which has melt stability sufficient to apply general melt processing techniques and also a high molecular weight.

DETAILED DESCRIPTION OF THE INVENTION

Features of the present invention will hereinafter be described in detail.

Chemical Structure of PTKs

The melt-stable PTKs according to the present invention are poly(arylene thioether-ketones) (PTKs) having predominant recurring units of the formula

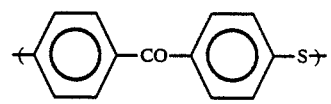

wherein the —CO— and —S— are in the para position to each other. In order to be heat-resistant polymers comparable with PEEK and PEK, the PTKs usable for the practice of this invention may preferably contain, as a main constituent, the above recurring units in a proportion greater than 50 wt. %, more preferably, of 60 wt. % or higher, most preferably, of 70 wt. % or higher. If the proportion of the recurring units is 50 wt. % or less, there is a potential problem that the crystallinity of the polymer is reduced and its heat resistance is reduced correspondingly.

Exemplary recurring units other than the above recurring units may include:

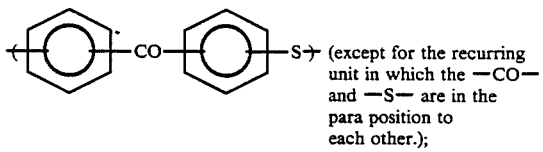 (except for the recurring unit in which the —CO— and —S— are in the para position to each other.);

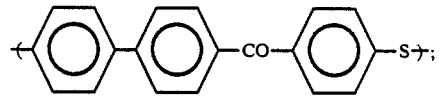

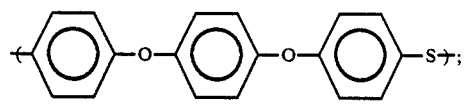

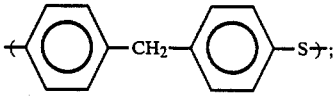

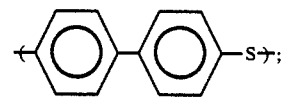

-continued

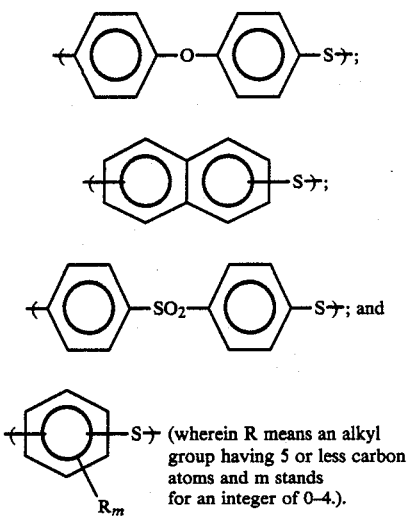

(wherein R means an alkyl group having 5 or less carbon atoms and m stands for an integer of 0–4.).

It is desirable that the melt-stable PTKs employed in this invention are uncured polymers, especially, uncured linear polymers. The term "cure" as used herein means a molecular-weight increasing treatment by a method other than a usual polycondensation reaction, for example, by a crosslinking, branching or molecular-chain extending reaction, particularly, a molecular-weight increasing treatment by a high-temperature heat treatment or the like. In general, "curing" causes a PTK to lose or decrease its melt stability and crystallinity. Curing therefore makes it difficult to employ conventional melt processing of a PTK. Even if a formed product such as a film is obtained, the product tends to have a low density and reduced crystallinity, in other words, may not be regarded as "a heat-resistant formed product" substantially. Curing is hence not preferred. However, PTKs having a partially crosslinked and/or branched structure to such an extent still allowing the application of conventional melt processing techniques are still acceptable as PTKs usable in the present invention. For example, PTKs obtained by conducting polymerization in the presence of a small amount of a crosslinking agent (e.g., polychlorobenzophenone, polybromobenzophenone or the like) and PTKs subjected to mild curing can be regarded as melt-stable PTKs useful in this invention.

Physical Properties of PTKs

Summary of the physical properties:

The melt-stable PTKs useful in the practice of this invention have the following physical properties.

(a) As indices of the characteristics of heat-resistant polymers, their melting points, Tm range from 310° to 380° C.

(b) As indices of the melt stability of polymers to which conventional melt processing techniques can be applied, their residual melt crystallization enthalpies, ΔHmc (420° C./10 min) are at least 10 J/g, and their melt crystallization temperatures, Tmc (420° C./10 min) are at least 210° C.

(c) In the case of extrusion products such as films, their shaping is difficult due to drawdown or the like upon melt forming unless the molecular weight is sufficiently high. They should have a high molecular weight. As indices of the molecular weights of the polymers, their reduced viscosities $\eta_{red}$ should be within the range of 0.3–2 dl/g. In the present invention, each reduced viscosity $\eta_{red}$ is expressed by a value as determined by viscosity measurement at 25° C. and a polymer concentration of 0.5 g/dl in 98 percent by weight sulfuric acid as a solvent.

(d) As indices of the characteristics of highly-crystalline polymers, the polymers have a density of at least 1.34 g/cm³ at 25° C. when annealed at 280° C. for 30 minutes.

Details of the Physical Properties (1) Heat resistance:

The melting point, Tm of a polymer serves as an index of the heat resistance of the polymer.

The PTKs useful in the practice of this invention have a melting point, Tm of 310°–380° C., preferably 320°–375° C., more preferably 330°–370° C. Those having a melting point, Tm lower than 310° C. are insufficient in heat resistance as heat-resistant resins comparable with PEEKs and PEKs. On the other hand, it is difficult to perform the melt processing of those having a melting point Tm higher than 380° C. without decomposition. Such an excessively low or high melting point is undesired.

(2) Melt stability:

The greatest feature of the PTKs useful in the practice of this invention resides in that they have melt stability sufficient to permit the application of conventional melt processing techniques.

All the conventional PTKs have low melt stability and tend to lose their crystallinity or to undergo crosslinking or carbonization, resulting in a rapid increase in melt viscosity, upon their melt processing.

It is hence possible to obtain an index of the melt processability of a PTK by investigating the residual crystallinity of the PTK after holding it at an elevated temperature of its melt processing temperature or higher for a predetermined period of time. The residual crystallinity can be evaluated quantitatively in terms of melt crystallization enthalpy. Specifically, the residual melt crystallization enthalpy, ΔHmc (420° C./10 min) of the PTK and its melt crystallization temperature, Tmc (420° C./10 min) for the PTK which are determined by a DSC at a cooling rate of 10° C./min, after the PTK is held at 50° C. for 5 minutes in an inert gas atmosphere, heated to 420° C. at a rate of 75° C./min and then held for 10 minutes at 420° C., can be used as measures of its melt stability. In the case of a PTK having poor melt stability, it undergoes crosslinking or the like at the above high temperature condition of 420° C. and loses its crystallinity substantially.

The melt-stable PTKs of the present invention are polymers whose residual melt crystallization enthalpies, ΔHmc (420° C./10 min) are preferably at least 10 J/g, more preferably at least 15 J/g, most preferably at least 20 J/g and whose melt crystallization temperatures, Tmc (420° C./10 min) are preferably at least 210° C., more preferably at least 220° C., most preferably at least 230° C.

A PTK, whose ΔHmc (420° C./10 min) is smaller than 10 J/g or whose Tmc (420° C./10 min) is lower than 210° C., tends to lose its crystallinity or to induce a melt viscosity increase upon its melt processing, so that difficulties are encountered upon application of conventional melt processing techniques. It is hence difficult to form such a PTK into a film.

(3) Molecular weight:

The solution viscosity, for example, reduced viscosity, $\eta_{red}$ of a polymer can be used as an index of its molecular weight.

When a PTK or a composition thereof is melt-extruded into a film, drawdown or the like may occur as a problem upon its melt processing.

Therefore, the molecular weight which is correlated directly to the melt viscosity of the PTK is also an important factor for its melt processability.

In order to apply conventional melt processing techniques, high molecular-weight PTKs whose reduced viscosities, $\eta_{red}$ are preferably 0.3–2 dl/g, more preferably 0.5–2 dl/g are desired. Since a PTK whose $\eta_{red}$ is lower than 0.3 dl/g has a low melt viscosity and high tendency of drawdown, it is difficult to apply conventional melt processing techniques. Further, the resulting stretched film is insufficient in mechanical properties.

On the other hand, a PTK whose $\eta_{red}$ exceeds 2 dl/g is very difficult to be produced and processed.

(4) Crystallinity:

As an index of the crystallinity of a polymer, its density is used.

The PTKs useful in the practice of this invention are desirably polymers whose densities (at 25° C.) are preferably at least 1.34 g/cm$^3$, more preferably at least 1.35 g/cm$^3$ when measured in a crystallized form by annealing them at 280° C. for 30 minutes. Those having a density lower than 1.34 g/cm$^3$ have potential problems that they may have low crystallinity and hence insufficient heat resistance and their melt processability and the mechanical properties of resulting stretched films may also be insufficient.

In particular, PTKs crosslinked to a high degree (e.g., the PTKs described in Publication A) have been reduced in crystallinity and their densities are generally far lower than 1.34 g/cm$^3$.

Production Process of PTKs

The melt-stable PTKs useful in the practice of this invention can each be produced, for example, by subjecting an alkali metal sulfide and a dihalogenated aromatic compound, preferably, dichlorobenzophenone and/or dibromobenzophenone to dehalogenation and sulfuration, for a short period of time, in the substantial absence of a polymerization aid (a salt of a carboxylic acid, or the like), in an aprotic polar organic solvent, preferably, an organic amide solvent (including a carbamic amide or the like) and in a system having a water content far higher compared with conventionally-reported polymerization processes while controlling the temperature profile suitably, and if necessary, by choosing the material of a reactor suitably.

Namely, the melt-stable PTKs useful in the practice of this invention can each be produced suitably by polymerizing an alkali metal sulfide and a dihalogenated aromatic compound consisting principally of dichlorobenzophenone and/or dibromobenzophenone by dehalogenation and sulfuration under the following conditions (a)–(c) in an organic amide solvent.

(a) ratio of the water content to a charge of the organic amide: 2.5–15 (mole/kg);

(b) ratio of the amount of the charged dihalogenated aromatic compound to the amount of the charged alkali metal sulfide: 0.95–1.2 (mole/mole); and (c) reaction temperature: 60°–300° C. with a proviso that the reaction time at 210° C. and higher is within 10 hours.

The melt-stable PTKs can be obtained more suitably when a reactor at least a portion of which, said portion being brought into contact with the reaction mixture, is made of a titanium material.

Further, at least one halogen-substituted aromatic compound having at least one substituent group having electron-withdrawing property at least equal to —CO— group (preferably, 4,4'-dichlorobenzophenone and/or 4,4'-dibromobenzophenone employed as a monomer) may be added and reacted (as a stabilization treatment in a final stage of the polymerization) so as to obtain PTKs improved still further in melt stability.

The melt-stable PTKs employed in the present invention may preferably be uncured polymers as described above. They may however be PTKs in which a crosslinked structure and/or a branched structure has been incorporated to a certain minor extent. In order to obtain a PTK with a branched or crosslinked structure introduced therein, it is preferable to have a polyhalogenated compound, especially, a polyhalogenated benzophenone having at least three halogen atoms exist as a crosslinking agent in the polymerization reaction system in such an amount that the charge ratio of the monomeric dihalogenated aromatic compound to the polyhalogenated benzophenone ranges from 100/0 to 95/5 (mole/mole). If the charged amount of the polyhalogenated benzophenone is too much, physical properties of the resulting PTK, such as its melt processability, density and crystallinity, will be reduced. It is hence not preferable to charge such a polyhalogenated benzophenone too much.

Thermoplastic Resin

The thermoplastic material used as a raw material of a stretched film in this invention may be composed of the melt-stable PTK alone. In view of processability, physical properties, economy and the like, it may also be a resin composition obtained by mixing at least one of other thermoplastic resins in a proportion of 0–100 parts by weight, preferably 0–90 parts by weight, and more preferably 0–80 parts by weight, all, per 100 parts by weight of the PTK. It is not preferable to add the thermoplastic resin in any amount greater than 100 parts by weight, because such a high proportion results in a stretched film of reduced heat resistance and strength.

As exemplary thermoplastic resins useful in the present invention, may be mentioned resins such as poly(arylene thioethers), aromatic polyether ketones, e.g., PEEKs and PEKs, polyamides (including Aramids), polyamideimides, polyesters (including aromatic polyesters and liquid crystalline polyesters), polysulfones, polyether sulfones, polyether imides, polyarylenes, poly(phenylene ethers), polycarbonates, polyester carbonates, polyacetals, fluoropolymers, polyolefins, polystyrenes, polymethyl methacrylate, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers.

Those thermoplastic resins may be used either singly or in combination.

Among the above-exemplified thermoplastic resins, poly(arylene thioethers), especially, poly(arylene thioethers) having predominant recurring units of the formula

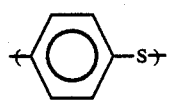

(hereinafter abbreviated as "PATEs"; said recurring units accounting for at least 50 wt. %) are preferred, because their blending can provide stretched films which have mechanical properties at room temperature improved over those obtained from the PTK alone and also heat resistance improved over those obtained from the PATEs alone and are well-balanced in heat resistance, mechanical properties and flow characteristics.

Among the above-described thermoplastic resins, aromatic polyether ketones can improve the drawdown, mechanical properties (toughness in particular), melt stability at the time of melt processing, etc. of the PTKs when blended with the latter. Although aromatic polyether ketones involve such problems as high prices and difficult forming and processing (i.e., have poor flow characteristics), it is feasible to improve their flow characteristics and heat resistance by blending them with the PTKs. As a further advantage, the blending of such an aromatic polyether ketone provides stretched films which are also attractive economically. As illustrative examples of the aromatic polyether ketone, PEKs and PEEKs may be mentioned.

Filler:

In this invention, at least one of fillers and/or at least one of inorganic fillers may be added in a proportion up to 15 parts by weight per 100 parts by weight of the PTK as desired. If the proportion of the filler exceeds 15 parts by weight, there is a potential problem that the processability may be deteriorated to a considerable extent and the physical properties of the resulting stretched films would be deteriorated.

As exemplary fibrous fillers usable in this invention, may be mentioned fibers such as glass fibers, carbon fibers, graphite fibers, silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers.

As exemplary inorganic fillers, may be mentioned talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all, in a powder form.

These fibrous fillers and inorganic fillers may be used either singly or in combination.

Optional Components:

In the present invention, it is also possible to add one or more additives such as stabilizer, anticorrosive, lubricant, surface-roughening agent, ultraviolet absorbent, nucleating agent, mold-releasing agent, colorant, coupling agent and/or antistatic agent, as needed.

Production Process of Stretched Film

The stretched film of this invention can be produced by melt-forming a thermoplastic material, which is composed of the melt-stable PTK alone or a composition formed of 100 parts by weight of the PTK and up to 100 parts by weight of at least one of thermoplastic resins and/or up to 15 parts by weight of at least one of fillers, into a film by usual T-die extrusion (an extrusion method making use of a T-die), inflation (an extrusion method employing a ring die), hot pressing or the like, stretching the film, and then heat setting the thus-stretched film.

Described specifically, a substantially amorphous film is obtained first of all, for example, by charging the thermoplastic material into an extruder fitted with a T-die or ring die in the air or an inert gas atmosphere, melt-forming the thermoplastic material at 320°–430° C. into a film and then quenching the film or by pressing and forming the thermoplastic material into a film by a hot pressing machine while heating and melting it at 320°–430° C. and then quenching the film. Incidentally, the term "amorphous film" as used herein means a stretchable film at the temperature around the glass transition point. The ratio $\Delta STc/\Delta STm$ should be at least 0.1, where $\Delta STc$ is the enthalpy upon crystallization when the amorphous film is heated at a rate of 10° C./min from room temperature by using a differential scanning calorimeter (DSC), $\Delta STm$ is also the enthalpy on melt when the film is heated in the above manner.

Where the amorphous film is obtained from the thermoplastic material composed of the melt-stable PTK and the thermoplastic resin and two endothermic peaks and two exothermic peaks occur upon melting of its crystals and its crystallization respectively, it is possible to use values which are obtained by adding enthalpies corresponding to the respective heat quantities.

Such an amorphous film can be obtained by quenching a molten film at a cooling rate of at least 200° C./min with a cooling medium such as water on a cooling drum. Unless an amorphous film is used, stretching around the glass transition temperature is difficult.

Incidentally, when an extruder such as that equipped with a T-die is used, it is preferred that the extruder is made of a non-ferrous corrosion-resistant material at portions where it is brought into contact with a molten resin. It is also preferred that the extruder is vented.

Next, the amorphous film obtained in the above-described manner is stretched to a draw ratio of from 1.5:1 to 7:1 in one direction, i.e., a uniaxial direction or in one direction and another direction perpendicular to said one direction, i.e., biaxial directions at 100°–180° C. by a stretching machine of the roll or stenter type or a similar type or by a similar machine. When stretching the amorphous film in biaxial directions, the stretching may be performed by either sequential or simultaneous biaxial stretching.

In the case of uniaxial stretching, the stretching in one direction is effected at a draw ratio of from 1.5:1 to 7:1, preferably, from 2:1 to 6:1 at 100°–180° C., preferably, 120°–160° C. to make the birefringence of the film fall within the range of from 0.05 to 0.35 and the resulting film is thereafter heat set at a temperature of from 200° C. to a temperature just below the melting point of the PTK. If the temperature is lower than 100° C. here, the stretching is difficult to perform and moreover, substantial tearing takes place. At temperatures over 180° C., the film is rendered brittled due to its crystallization and significant tearing also takes place. On the other hand, the draw ratio may suitably be in the range of from 1.5:1 to 7:1 in view of the degree of orientation of the film and the tearing of the film. The speed of the stretching may preferably be in a range of 10–10,000 %/min.

When sequential biaxial stretching is performed, the first-stage stretching is effected as in the above uniaxial stretching, namely, at 100°–180° C., preferably, 120°–160° C. and at a draw ratio of 1.5:1 to 7:1, preferably, 2:1 to 6:1 so as to make the birefringence of the film fall within a range of from 0.05 to 0.35. As the second stretching, the resultant film is then stretched at 100°–180° C., preferably, 120°–160° C. to a draw ratio of from 1.5:1 to 7:1, preferably, from 2:1 to 6:1 in a direction perpendicular to the stretching direction of the first-stage stretching, followed by heat setting at a temperature of from 200° C. to the melting point of the PTK. If the temperature of the second-stage stretching is lower than 100° C., the stretching is difficult to perform and substantial tearing of the film takes place. If it exceeds 180° C. on the contrary, the film is rendered brittle due to its crystallization and again, substantial tearing of the film occurs. The draw ratio of the second-stage stretching may suitably be in a range of from 1.5:1 to 7:1 in view of the degree of orientation of the film and the tearing of the film. The speed of the second-stage stretching may preferably be in a range of 10–10,000 %/min.

In the case of simultaneous biaxial stretching, the stretching is performed at 100°–180° C., preferably, 120°–160° C. and at a draw ratio of 1.5:1 to 7:1, preferably, 2:1 to 6:1 in both machine and transverse directions. Here, the birefringence of the film ranges from 0 to 0.35. After the stretching, the resultant film is heat set at a temperature of from 200° C. to the melting point of the PTK. If the stretching temperature is lower than 100° C., it is not preferable because it may cause the film to split or whiten. At temperatures higher than 180° C. on the other hand, the film tends to crystallize either before or during its stretching so that the stretching of the film becomes difficult and the film is susceptible to breakage. If the draw ratio is smaller than 1.5:1, it is only possible to obtain films insufficient in mechanical properties such as strength and modulus. It the film is stretched to a draw ratio greater than 7:1, the film is whitened and/or torn considerably.

The heat set may be performed at a temperature of from 200° C. to a temperature just below the melting point of the PTK, preferably, in a range of 250°–330° C., for 1–3,000 seconds, more preferably, 5–2,500 seconds while being restrained from shrinkage under stress (tension) to the film and limiting its deformation within ±20%. After the heat set, the film may be subjected to thermal relaxation at 200°–360° C., substantially under no stress, for 1–3,000 seconds, preferably, 5–2,000 seconds as needed. The density of the stretched film is increased by the heat set, so that the density (25° C.) of PTK portions reaches at least 1.34 g/cm² and its heat resistance, dimensional stability, mechanical strength and the like are also improved.

Further, in order to obtain a stretched film having practical utility, it is necessary in a uniaxially stretched film to make the birefringence (the difference between the refractive in the stretched direction and that in a direction perpendicular to the stretched direction) fall within the range of from 0.05 to 0.35. If the birefringence is smaller than 0.05, sufficient strength cannot be obtained at elevated temperatures. If it is greater than 0.35 on the contrary, the film tends to undergo splitting and in addition, is whitened to fail to provide sufficient strength when the film is heat-treated. After the above-described stretching, the film may optionally be stretched further, as a second-stage stretching, in a direction perpendicular to the direction of the previous stretching. If the birefringence is smaller than 0.05, the film may be wrinkled or rendered brittle in the subsequent heat treatment. If the birefringence exceeds 0.35, the film may be whitened or in some instances, undergoes splitting to render the stretching no longer feasible in the second-stage stretching. Birefringences outside the above range are therefore not preferred. In order to control the birefringence of the uniaxially-stretched film within the above range, the stretching must be performed under the above-mentioned conditions.

A high-lubricity film having a coefficient of surface dynamic friction of 0.7 or smaller can be obtained, for example, by adding a small amount of an inorganic filler such as calcium carbonate, kaolin, clay, alumina, silica or titanium oxide to the melt-stable PTK or to the composition of the melt-stable PTK and at least one of other thermoplastic resins and then forming the resultant mixture into a film, by treating both sides of an unstretched film with an organic solvent having high compatibility with the PTK and then stretching it, or by roughening one or both surfaces of a stretched film by sand blasting or surface-roughening rolls.

Physical Properties of Stretched Film

The stretched film of this invention generally has an average thickness of 0.1–3,000 μm, preferably, 1–2,000 μm and has the following excellent physical properties:

(a) density of PTK portions being at least 1.34 g/cm³ at 25° C.;

(b) tensile strength being at least 5 kg/mm² at 23° C. or at least 1 kg/mm² at 270° C.;

(c) tensile modulus being at least 200 kg/mm² at 23° C. or at least 5 kg/mm² at 270° C.;

(d) temperature of 10-seconds solder heat resistance being at least 280° C.; and (e) coefficient of surface dynamic friction being 0.7 or smaller.

(Measurements of physical properties)

* Density of PTK portions (25° C.):

Where the thermoplastic material as the raw material of the film is composed of the PTK alone, the density (25° C.) of PTK portions is the same as the density (25° C.) of the stretched film. Where the thermoplastic material contains the thermoplastic resin and/or filler in addition to the PTK, a sample is separately prepared under the same conditions for the production of the stretched film by using the same thermoplastic material except for the omission of the PTK, and the density (25° C.) of PTK portions can be determined from the density (25° C.) of the stretched film and the density (25° C.) of the sample free of the PTK.

Density of the stretched film =

$$1 \bigg/ \left\{ \frac{\text{Weight fraction of } PTK \text{ portions}}{\text{Density of } PTK \text{ portions}} + \frac{1 - (\text{Weight fraction of } PTK \text{ portions})}{\text{Density of sample free of } PTK} \right\}$$

* Tensile strength:
  ASTM-D638.
* Tensile modulus:
  ASTM-D638.

* Solder heat resistance:

The solder heat resistance is expressed in terms of the highest temperature of a bath of molten solder at which temperature a stretched film does not develop marked changes in external appearance such as blister, wrinkles and shrinkage even when dipped for 10 seconds in the bath.

* Coefficient of surface dynamic friction:

ASTM-D1894. The coefficient of surface dynamic friction of the stretched film is measured at 25° C. against another stretched film of the same kind as the first-mentioned stretched film.

As described above, the stretched PTK film of this invention is a film obtained by using a melt-stable PTK having a high molecular weight of 0.3–2 dl/g in terms of reduced viscosity, a density of 1.34 g/cm$^3$ when annealed at 280° C. for 30 minutes and a melting point Tm of 310°–380° C. The stretched PTK film thus has high heat resistance and strength.

Application Fields

The stretched films of this invention can be used in a wide variety of fields, for example, as base films for magnetic recording materials (including films for vacuum deposition or sputtering and magnetic recording films of the perpendicular magnetization type), films for capacitors (especially, films for chip-type capacitors), printed circuit boards (including both flexible and rigid types), insulating films, printer tapes, stampable sheets, various trays, containers, etc.

ADVANTAGES OF THE INVENTION

Stretched PTK films having high heat resistance, strength and lubricity were successfully obtained by the present invention. PTKs according to conventional techniques had poor melt stability, so that melt processing was not applicable thereto. Owing to the use of the novel melt-stable PTK in this invention, melt processing and stretching have both become feasible and stretched PTK films having excellent physical properties have been provided.

The stretched PTK films according to this invention can be used in a wide variety of fields in which heat resistance, strength and lubricity are required.

EMBODIMENTS OF THE INVENTION

The present invention will hereinafter be described specifically by the following Examples, Comparative Examples and Experiments. It should however be borne in mind that the scope of the present invention is not limited to the following Examples and Experiments.

Experiments

Synthesis Experiment 1

(Synthesis of Melt-stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 53.6 wt. %; product of Sankyo Kasei Co., Ltd.) and 90 kg of N-methylpyrrolidone (hereinafter abbreviated as "NMP") (water content/NMP=5.0 moles/kg). After the reactor being purged with nitrogen gas, the resultant mixture was heated from room temperature to 240° C. for 1.5 hours and then maintained at 240° C. for 2.5 hours. In order to apply the final-stage treatment of the polymerization, the reaction mixture was heated to 260° C. over 1 hour while charging under pressure a mixture composed of 9.0 moles of DCBP, 15 kg of NMP and 75 moles of water. The resultant mixture was maintained further at 260° C. for 0.3 hour to react them.

The reactor was cooled, and the reaction mixture in the form of a slurry was taken out of the reactor and was then poured into about 200 l of acetone. The resultant polymer was precipitated. The polymer was collected by filtration, and then washed twice with acetone and additionally twice with water. Acetone and water were removed to obtain the polymer in a wet form. The wet polymer was dried at 80° C. for 12 hours under reduced pressure, thereby obtaining Polymer P1 as powder.

Synthesis Experiment 2

(Synthesis of Melt-stable PTK)

A titanium-lined reactor was charged with 90 moles of DCBP, 0.9 mole of p-dibromobiphenyl, 90 moles of hydrated sodium sulfide (water content: 53.6 wt. %) and 90 kg of NMP (water content/NMP=5.0 moles/kg). After the reactor being purged with nitrogen gas, the resultant mixture was heated from room temperature to 240° C. over 1.5 hours and then maintained at 240° C. for 2.5 hours. The reaction mixture in the form of a slurry was processed in the same manner as in Synthesis Experiment 1, thereby obtaining Polymer P2 as powder.

<Measurement of Physical Properties>

Measurement of melting points:

With respect to each of the PTKs thus obtained, the melting point Tm was measured as an index of its heat resistance. The measurement was performed in the following manner. About 10 mg of each PTK (powder) was weighed. Using a differential scanning calorimeter (Model TC10A; manufactured by Mettler Company), the sample was held at 50° C. for 5 minutes in an inert gas atmosphere and was then heated at a rate of 10° C./min so as to measure its melting point.

Measurement of residual melt crystallization enthalpies:

With respect to each of the PTKs thus obtained, the residual melt crystallization enthalpy ΔHmc (420° C./10 min) and the melt crystallization temperature, Tmc (420° C./10 min) were measured as an index of its melt stability. Namely, the temperature corresponding to a peak of melt crystallization measured by the DSC. is represented by Tmc (420° C./10 min) and the amount of heat converted from the area of the peak was taken as residual melt crystallization enthalpy, ΔHmc (420° C./10 min). Described specifically, about 10 mg of each PTK (powder form) was weighed. After holding the PTK at 50° C. for 5 minutes in an inert gas atmosphere, it was heated at a rate of 75° C./min up to 420° C. and held at that temperature for 10 minutes. While cooling the PTK at a rate of 10° C./min, its ΔHmc (420° C./10 min) and Tmc (420° C./10 min) were measured Results are collectively shown in Table 1.

Measurements of densities and solution viscosities:

As indices of crystallinity of the PTKs, their densities were measured. Namely, each PTK (powder) was first of all placed between two polyimide films ("Kapton", trade mark; product of E. I. du Pont de Nemours & Co., Inc.). It was preheated at 385° C. for 2 minutes and then press-formed at 385° C. for 0.5 minute by a hot press. It was then quenched to obtain an amorphous sample whose thickness was about 0.15 mm. A part of the amorphous sheet was used directly as a sample, while the other part was annealed at 280° C. for 30 minutes to use it as an annealed sample with an increased degree of crystallinity. Their densities were measured at 25° C. by means of a density gradient tube [lithium bromide/water]. As indices of the molecular weights of the PTKs, their solution viscosities (reduced viscosities $\eta_{red}$ were measured.

Namely, each PTK sample was dissolved in 98 wt. % sulfuric acid to give a polymer concentration of 0.5 g/dl. The reduced viscosity of the resultant solution was then measured at 25° C. by means of a Ubbellohde viscometer.

Measurement results of the respective physical properties are shown collectively in Table 1.

TABLE 1

|  | Example | |
|---|---|---|
|  | Synthesis Experiment 1 | Synthesis Experiment 2 |
| Heat resistance | | |
| Tm (°C.) | 366 | 365 |
| Melt stability | | |
| ΔHmc (420° C./10 min) (J/g) | 56 | 43 |
| Tmc (420° C./10 min) (°C.) | 306 | 290 |
| Density (25° C.) | | |
| Amorphous film | 1.30 | 1.30 |
| Annealed film | 1.35 | 1.35 |
| Molecular weight | | |
| $\eta_{red}$ (dl/g) | 0.81 | 0.61 |
| Remarks Polymer No. | P1 | P2 |

EXAMPLE 1

Under a nitrogen gas stream, Polymer P1 was charged into a small extruder equipped with a T-die. It was melt-extruded at 375° C. and then quenched on a cooling roll, thereby producing an amorphous film having an average thickness of 150 μm.

In the above operation, the temperature of the cooling roll was 50° C., the distance between the tip of the T-die and the cooling roll was about 1 cm, and the flow rate of resin from the tip of the T-die was 30 cm/min. Therefore, the external cooling rate of the molten resin film was at least 200° C./min.

In addition, the ratio ΔSTc/ΔSTm of the enthalpy upon crystallization when the film it is heated at a rate of 10° C./min by using a DSC to the enthalpy on melt when the film is heated in the above manner was 0.29.

The amorphous film thus produced from P1 was stretched to a draw ratio of 5:1 in one direction at 155° C. by using a tensilon (manufactured by Boldwin Company). The birefringence of the stretched film was 0.28. It was then heat set at 310° C. for 5 minutes while maintaining its length constant. It was thereafter subjected to thermal relaxation at 290° C. for 5 minutes under no stress, whereby a uniaxially-stretched film (Stretched Film 1) was produced.

Measurement of birefringence:

The birefringence of each uniaxially-stretched film was determined by measuring the retardation (the amount of delay between the speed of light along the axis of orientation of the film and that in a direction perpendicular to the axis of the orientation) and then using the equation, retardation=(film thickness)×(birefringence). Where the retardation of a sample film is large and its measurement is difficult, the retardation of the sample film is measured in a reduced state by precisely superposing a film having a known retardation value at right angle on the sample film. The known retardation value of the superposed film is thereafter added to a retardation value thus measured, so that the retardation value of the sample film is determined. The birefringence of the uniaxially-stretched film is then determined by dividing the thus-obtained retardation value thereof with its thickness.

EXAMPLE 2

The amorphous film produced from Polymer P1 in Example 1 was stretched to a draw ratio of 3:1 in the machine direction at 155° C. as first-stage stretching by a biaxial stretching testing machine (manufactured by Toyo Seiki Seisakusho, Ltd.). The birefringence of the film was 0.19. It was then stretched to a draw ratio of 2.9:1 in the transverse direction at 157° C. as second-stage stretching, heat set at 310° C. for 5 minutes while maintaining the length and then subjected to thermal relaxation at 290° C. for 5 minutes under no stress, thereby producing a biaxially-stretched film (Stretched Film 2).

EXAMPLE 3

The amorphous film produced from Polymer P1 in Example 1 was biaxially stretched to a draw ratio of 3.2:1 in the machine direction and at the same time, to a draw ratio of 3.2:1 in the transverse direction at 156° C. by the biaxial stretching testing machine used in Example 2. The thus-obtained film was heat set at 320° C. for 5 minutes while maintaining its length constant, thereby producing a biaxially-oriented film (Stretched Film 3).

Physical properties of the individual stretched films are shown in Table 2.

TABLE 2

|  | Example 1 | Example 2 | Example 3 |
|---|---|---|---|
| Polymer No. of PTK | P1 | P1 | P1 |
| Draw ratio (machine/transverse)** | 5:1/— | 3:1/2.9:1 | 3.2:1/3.2:1 |
| Density (25° C.)* (g/cm³) | 1.36 | 1.36 | 1.36 |
| Tensile strength (machine/transverse)** | | | |
| 23° C. (kg/mm²) | 21/— | 16/15 | —/18 |
| 270° C. (kg/mm²) | 17/— | 10/8 | —/11 |
| Tensile modulus (machine/transverse)** | | | |
| 23° C. (kg/mm²) | 560/— | 390/380 | —/420 |
| 270° C. (kg/mm²) | 70/— | 30/20 | —/40 |
| Solder heat resistance (°C.) | >310 | >310 | >310 |
| Remarks | Stretched | Stretched | Stretched |
| Stretched Film No. | Film 1 | Film 2 | Film 3 |
| Stretching method | Uniaxial | Biaxial (Sequential) | Biaxial (Simultaneous) |

*Density gradient tube method in lithium bromide/water system.
**In "(machine/transverse)" used in the table, "machine" means the stretching direction (MD) in the first-stage stretching and "transverse" denotes the stretching direction (TD) in the second-stage stretching.

EXAMPLE 4

In a Henschel mixer, 1 part by weight of titanium oxide powder and 1 part by weight of silica powder were mixed well with 100 parts by weight of Polymer P1 to obtain a blend.

The blend was charged under a nitrogen gas stream into a single-screw extruder having a cylinder diameter of 40 mm and a cylinder length of 1 m and equipped with a nozzle having a diameter of 5 mm. It was extruded at 375° C. into strands. The strands were quenched and chopped into pellets. The thus-obtained pellets were heat-treated for 3 hours in an oven of 160° C.

Using those pellets, a biaxially-stretched film was produced in the same manner as in Example 2. The birefrengence of the uniaxially-stretched film before the second-stage stretching was 0.18. The coefficient of surface dynamic friction of the thus-obtained biaxially-stretched film was 0.45 as measured at 25° C. against another stretched film of the same kind as the biaxially-stretched film in accordance with the testing method of ASTM-D1894. It was therefore a high-lubricity film.

EXAMPLES 5-7

Polymer P2 were charged under a nitrogen gas steam into a small twin-screw extruder equipped with a nozzle having a diameter of 3 mm. It was extruded into strands at 370° C. and an extrusion rate of about 1.6 kg/hour. After cooling, the strands were formed into pellets. The thus-obtained pellets were heat-treated for 4 hours in an oven of 155° C. Using an extruder which was equipped with a T-die having a lip clearance of 0.5 mm and a width of 250 mm and had a cylinder diameter of 35 mm and an L/D ratio of 28, the above pellets were melt-extruded. The temperature of the molten resin was 370° C. The molten film was immediately quenched on a metal roll of 79° C. by applying a static potential of 5 KV via a pinning apparatus (casting). Since the resin temperature was 370° C. at the die lip outlet, the flow rate of the resin was 21 cm/min and the distance from the tip of the die lip to the point of contact of the resin with the metal roll (cast roll) was about 1 cm, the external cooling rate of the resin was at least 200° C./min.

An amorphous film ($\Delta STc/\Delta STm = 0.31$) which had been obtained by effecting quenching in the above manner was uniaxially and continuously stretched via guide rolls. The stretching temperature was 145° C. in terms of the surface temperature of stretching roll. The draw ratio was 2.5:1. The birefringence of the thus-obtained film was 0.16. The uniaxially-stretched film was then biaxially stretched and heat set by a stenter biaxial stretching machine which was controlled at a stretching temperature of 136° C. and a heat setting temperature of 290° C. The draw ratio was 3:1 and the relaxation ratio was 5%. The travelling speed of the film inside the stenter was 3.5 m/min and the thickness of the resultant film was 12 μm.

(EXAMPLE 5)

Portions of the thus-obtained film were respectively held between square metal frames having a length of 30 cm per side to fix the films along the entire peripheries thereof. The films were thereafter heat set under the following conditions while maintaining the lengths of the films constant, so that two kinds of films were produced, one being a film heat set for 10 minutes in an oven controlled at 300° C. (Example 6) and the other a film heat set for 10 minutes in an oven controlled at 340° C. (Example 7).

Physical properties of the thus-obtained films are shown in Table 3.

TABLE 3

| | Physical properties of film | | | | |
|---|---|---|---|---|---|
| | Tensile strength machine/transverse* (23° C.) (kg/mm) | Elongation machine/transverse* (23° C.) (%) | Tensile modulus in machine/transverse* (23° C.) (kg/mm) | Density (25° C.) (g/cm) | Solder heat resistance (°C.) |
| Ex. 5 | 16/17 | 29/30 | 300/300 | 1.35 | >285 |
| Ex. 6 | 15/17 | 26/24 | 290/290 | 1.36 | >300 |
| Ex. 7 | 13/15 | 12/17 | 320/330 | 1.36 | >310 |

*In "(machine/transverse)" used in the table, "machine" means the stretching direction (MD) in the first-stage stretching and "transverse" denotes the stretching direction (TD) in the second-stage stretching.

COMPARATIVE EXAMPLE 1

The amorphous film obtained in Example 5 was simultaneously and biaxially stretched to a draw ratio of 3:1 in the machine direction and to a draw ratio of 3:1 in the transverse direction at 145° C. by the biaxial stretching testing machine used in Example 2. The thus-obtained film was heat set at 180° C. for 10 minutes while maintaining its length constant.

The solder heat resistance of the film was not higher than 280° C.

EXAMPLES 8-10

Using Polymer P1, pellets were obtained in the same manner as in Example 5. In addition, stretched films (thickness: 12 μm) were separately produced by the same extruder and stretching machine as those employed in Example 5 under the extrusion and film-forming conditions given in Table 4.

Those extrusion and film-forming conditions are physical properties of the stretched films are collectively shown in Table 4.

TABLE 4

| | | Example 8 | Example 9 | Example 10 |
|---|---|---|---|---|
| Melt extrusion | Melt extrusion temperature (°C.) | 370 | 370 | 370 |
| | Output (kg/hour) | 1.5 | 2.0 | 2.0 |
| Casting | Casting roll temperature (°C.) | 80 | 120 | 75 |
| | Die lip - casting roll distance (mm) | 10 | 10 | 10 |
| | Pinning voltage (KV) | 5 | 3 | 4.8 |
| | Cooling rate (°C./min) | >200 | >200 | >200 |
| First-stage stretching | Preheating temperature (°C.) | 95 | 100 | 80 |
| | Preheating time (sec) | 60 | 60 | 60 |
| | Stretching temperature (°C.) | 145 | 140 | 150 |
| | Draw ratio | 2.0:1 | 3.0:1 | 2.5:1 |
| | Birefringence | 0.12 | 0.20 | 0.18 |
| Second-stage stretching | Stretching temperature (°C.) | 130 | 140 | 135 |
| | Draw ratio | 2.5:1 | 3.3:1 | 3.5:1 |
| Heat set | Temperature (°C.) × Time (sec) | 300 × 300 | 330 × 60 | 320 × 120 |
| Physical properties of film | Tensile strength (23° C.) (machine/transverse)* (kg/mm$^2$) | 12/14 | 17/18 | 16/21 |
| | Tensile modulus (23° C.) | | | |

TABLE 4-continued

|  | Example 8 | Example 9 | Example 10 |
|---|---|---|---|
| (machine/transverse)* (kg/mm²) | 250/270 | 350/320 | 360/380 |
| Density (25° C.) (g/cm³) | 1.35 | 1.36 | 1.35 |
| Solder heat resistance (°C.) | >290 | >310 | >310 |

*In "(machine/transverse)" used in the table, "machine" means teh stretching direction (MD) in the first-stage stretching (MD) and "transverse" denotes the stretching direction (TD) in the second-stage stretching.

EXAMPLE 11

After mixing 80 parts by weight of Polymer P2 and 20 parts by weight of poly(paraphenylene thioether) (product of Kureha Chemical Industry Co., Ltd.; melt viscosity: 6800 poises at 310° C. and a shear rate of 200 sec⁻¹) at room temperature in a Henschel mixer, pellets were formed in the same manner as in Example 5. In the same manner as in Example 5, the pellets were heat-treated for 2 hours in an oven of 170° C. and a molten film was extruded and quenched to obtain an amorphous film (cooling rate: at least 200° C./min, $\Delta$STc/$\Delta$STm=0.30). The film was simultaneously and biaxially stretched to a draw ratio of 3:1 in the machine direction and to a draw ratio of 3:1 in the transverse direction at 150° C. in the same manner as in Example 3. (stretching speed: 2,000 %/min).

The thickness of the resultant film was 11 μm. The biaxially-stretched film was held on a metal frame to secure it along the entire periphery thereof, and was then heat set at 320° C. for 5 minutes while maintaining its length constant.

The tensile strength (23° C.), elongation (23° C.) and tensile modulus (23° C.) of the film were 20 kg/mm², 30% and 340 kg/mm² respectively. In addition, its solder heat resistance was at least 310° C., and the density of its PTK portions was 1.36 g/cm³.

EXAMPLE 12

After mixing 60 parts by weight of Polymer P2 and 40 parts by weight of PATE at room temperature in a Henschel mixer, pellets were produced in the same manner as in Example 5.

The pellets were heat-treated for 4 hours in an oven of 155° C. Following the procedure of Example 5, a molten film was extruded and then quenched into an amorphous film (cooling rate: at least 200° C./min, $\Delta$STc/$\Delta$STm=0.30).

Using the film, a stretched film was produced in the same manner as in Example 5 (film thickness: 15 μm). Upon production of the stretched film, the following film-processing conditions were employed.

| First-stage stretching | |
|---|---|
| Stretching temperature | 144° C. |
| Draw ratio | 3:1 |
| Birefringence | 0.17 |
| Second-stage stretching | |
| Stretching temperature | 127° C. |
| Draw ratio | 3.3:1 |
| Heat set | |
| Temperature | 290° C. |
| Time | 300 seconds |
| Relaxation ratio | 5% |

The tensile strength (machine/transverse) (23° C.), elongation (machine/transverse) (23° C.) and tensile modulus (machine/transverse) (23° C.) of the film were 18/21 kg/mm², 25/23% and 330/350 kg respectively. Its solder heat resistance was at least 285° C., while the density of its PTK portions was 1.36 g/cm³ Here, in the term "(machine/transverse)" used above, "machine" means the stretching direction (MD) in the first-stage stretching and "transverse" denotes the stretching direction (TD) in the second-stage stretching.

EXAMPLE 13

After mixing 60 parts by weight of Polymer P2 and 40 parts by weight of PEEK (product of Imperial Chemical Industries Ltd.) at room temperature in a Henschel mixer, pellets were produced in the same manner as in Example 5. The pellets were heat-treated for 2 hours in an oven of 170° C. Following the procedure of Example 5, a molten film was extruded and then quenched into an amorphous film (cooling rate: at least 200° C./min, $\Delta$STc/$\Delta$STm=0.30).

In the same manner as in Example 3, the film was biaxially and simultaneously stretched to a draw ratio of 3:1 in the machine direction and to a draw ratio of 3:1 in the transverse direction at 154° C., thereby obtaining a film whose thickness was 12 μm.

The biaxially-stretched film was held on a metal frame to secure it along the entire periphery thereof, and was then heat set at 330° C. for 10 minutes while maintaining its length constant.

The tensile strength (23° C.), elongation (23° C.) and tensile modulus (23° C.) of the film were 21 kg/mm², 35% and 400 kg/mm² respectively. In addition, its solder heat resistance was at least 320° C., and the density of its PTK portions was 1.36 g/cm³.

We claim:

1. A process for the production of a stretched poly(arylene thioether-ketone) film which comprises processing a thermoplastic material into the stretched poly(arylene thioether-ketone) film, wherein said thermoplastic material comprising:

(A) 100 parts by weight of a melt-stable poly(arylene thioether-ketone) having predominant recurring units of the formula

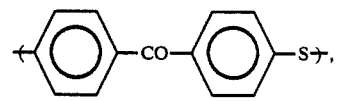

wherein the —CO— and —S— are in the para position to each other, and having the following physical properties (a)-(c):

(a) melting point, Tm being 310°–380° C.;
(b) residual melt crystallization enthalpy, $\Delta$Hmc (420° C./10 min) being at least 10 J/g, and melt crystallization temperature, Tmc (420° C./10 min) being at least 210° C., wherein $\Delta$Hmc (420° C./10 min) and Tmc (420° C./10 min) are determined by a differential scanning calorimeter at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and (c) reduced viscosity being 0.3-2 dl/g as determined by viscosity measurement at 25° C. and a polymer concentration of 0.5 g/dl in 98 percent by weight sulfuric acid; and optionally, (B) up to 100 parts by weight of at least one of thermoplastic resins and/or up to 15 parts by weight of at least one of fillers, wherein upon processing the thermoplastic material into the stretched poly(arylene thioether-ketone) film, the thermoplastic material is formed into an amorphous film, the amorphous film is stretched, as first-stage stretching, to a draw ratio of from 1.5:1 to 7:1 in one direction at 100°-180° C. to give a birefringence of 0.05-0.35, the resultant film is stretched, a optional second-stage stretching, to a draw ratio of from 1.5:1 to 7:1 in a direction perpendicular to said one direction at 100°-180° C., and the resulting film is then heat set at a temperature of from 200° C. to a temperature just below the melting point of the poly(arylene thioether-ketone).

2. The process as claimed in claim 1, wherein the amorphous film is obtained by melt-forming the thermoplastic material into a film at 320°-430° C. and then quenching the film at a cooling rate of at least 200° C./min.

3. A process for the production of a stretched poly(arylene thioether-ketone) film, which comprises processing a thermoplastic material into the stretched poly(arylene thioether-ketone) film, wherein said thermoplastic material comprising:

(A) 100 parts by weight of a melt-stable poly(arylene thioether-ketone) having predominant recurring units of the formula

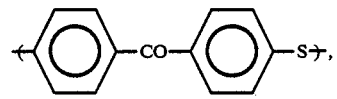

wherein the —CO— and —S— are in the para position to each other, and having the following physical properties (a)-(c):

(a) melting point, Tm being 310°-380° C.;

(b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and (c) reduced viscosity being 0.3-2 dl/g as determined by viscosity measurement at 25° C. and a polymer concentration of 0.5 g/dl in 98 percent by weight sulfuric acid; and optionally, (B) up to 100 parts by weight of at least one of thermoplastic resins and/or up to 15 parts by weight of at least one of fillers, wherein upon processing the thermoplastic material into the stretched poly(arylene thioether-ketone) film, the thermoplastic material is formed into an amorphous film, the amorphous film is stretched to a draw ratio of from 1.5:1 to 7:1 simultaneously in both machine and transverse directions at 100°-180° C. and is then heat set at a temperature of from 200° C. to a temperature just below the melting point of the poly(arylene thioether-ketone).

4. The process as claimed in claim 3, wherein the amorphous film is obtained by melt-forming the thermoplastic material into a film at 320°-430° C. and then quenching the film at a cooling rate of at least 200° C./min.

* * * * *